United States Patent [19]

Honma et al.

[11] 4,388,944
[45] Jun. 21, 1983

[54] DEVICE FOR CAPTURING AIR BUBBLES FROM FLUIDS IN PIPING

[75] Inventors: Keizo Honma, No. 6, Nishi 15-chome, Minami 15 Jo, Chuo-ku, Sapporo, Japan; Kunizo Honma, Sapporo, Japan

[73] Assignee: Keizo Honma, Sapporo, Japan

[21] Appl. No.: 181,192

[22] Filed: Aug. 25, 1980

[30] Foreign Application Priority Data

Aug. 30, 1979 [JP] Japan .......................... 54-119453[U]
Mar. 26, 1980 [JP] Japan ................................ 55-38337

[51] Int. Cl.³ .............................................. B01D 19/00
[52] U.S. Cl. ....................................... 137/171; 55/462
[58] Field of Search .................. 137/171, 202; 55/462, 55/463, 464, 465

[56] References Cited

U.S. PATENT DOCUMENTS

| 2,296,543 | 9/1942 | Steen | 55/199 |
| 2,461,666 | 2/1949 | Sullivan | 137/202 X |
| 2,745,511 | 5/1956 | Berck | 137/202 X |
| 2,913,068 | 11/1959 | Mistarz | 137/202 X |
| 2,929,503 | 3/1960 | Ambruster | 137/202 X |
| 3,292,913 | 12/1966 | Craig | 55/465 X |
| 3,547,085 | 12/1970 | Kovacik | 55/465 X |
| 3,952,765 | 4/1976 | Kimura | |
| 4,082,106 | 4/1978 | Butcher | 137/202 X |

Primary Examiner—Alan Cohen
Attorney, Agent, or Firm—Browdy & Neimark

[57] ABSTRACT

A device for capturing air from fluids in piping and for rendering noiseless the flow of fluids in piping. The device comprises an elongated body which is connected to the piping through inlet and outlet openings. The inlet opening is directed transversely to the flow of fluids within the elongated body, so that the fluids introduced into the body is vigorously agitated and bubbled for the effective capture of air contained in the fluids.

1 Claim, 9 Drawing Figures

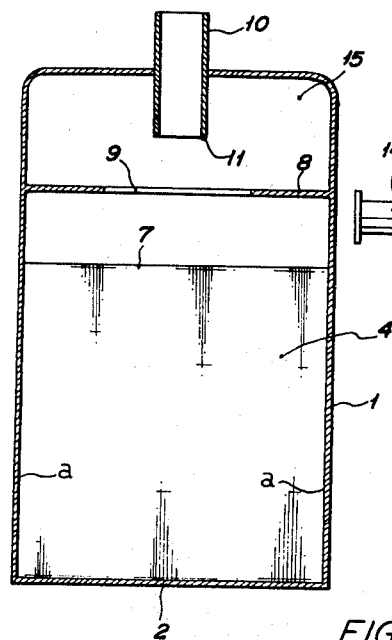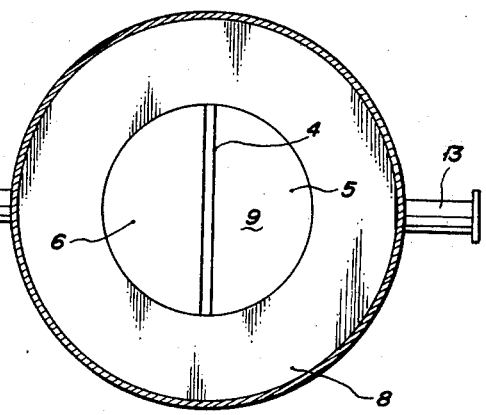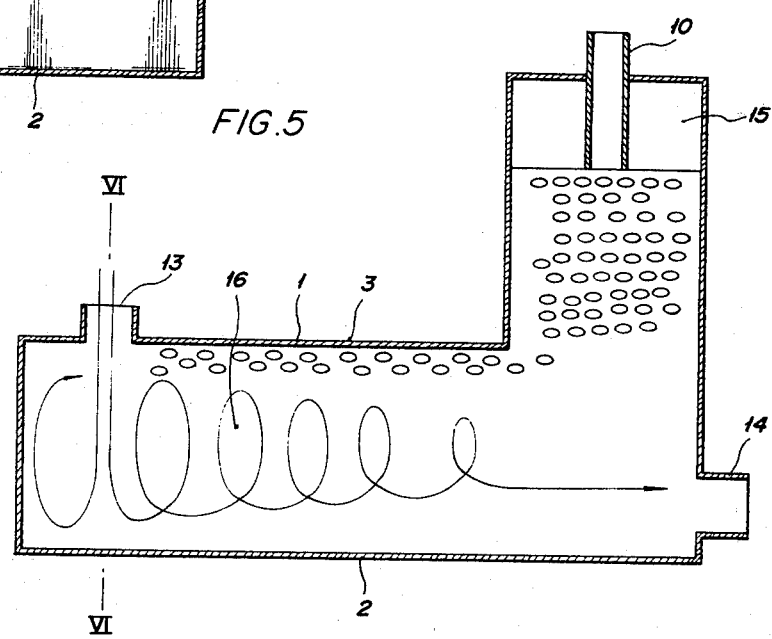

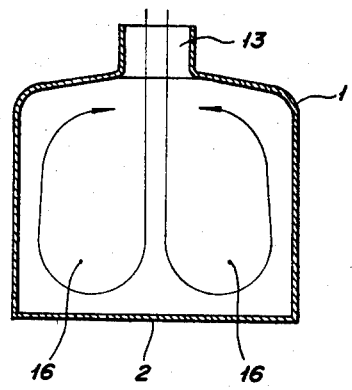
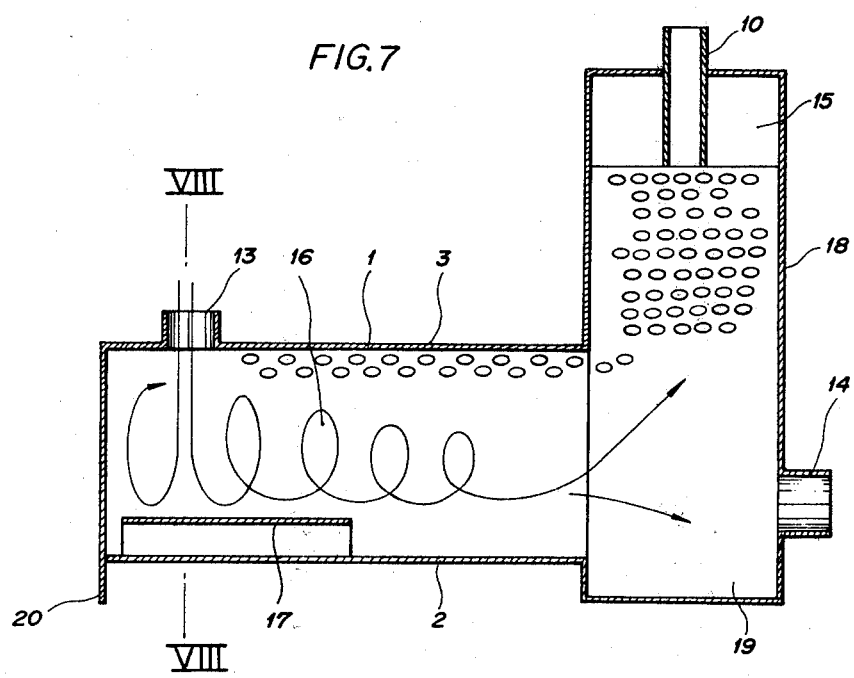

DEVICE FOR CAPTURING AIR BUBBLES FROM FLUIDS IN PIPING

FIELD OF THE INVENTION

This invention relates to a device for the escape of air bubbles from fluids in piping and for rendering noiseless the flow of fluids in piping, which has improved efficiency for the escape of air bubbles and which is easy for installation.

BACKGROUND OF THE INVENTION

In hot water supply systems at factories, hospitals, private homes and so on, there are usually provided, to their piping, devices of the aforementioned kind for rendering noiseless the flow of fluids in piping. An example of such devices is disclosed in U.S. Pat. No. 3,952,765.

However, conventional devices including the one described in said U.S. patent have several drawbacks. One of the drawbacks is that since they have poor efficiency for the escape of air bubbles from fluids in piping and for rendering noiseless the flow of fluids in piping, a plurality of devices have to be equipped to a single hot water supply system.

In view of the above, this invention has been made as follows.

In FIG. 1 which shows a prior art, a laterally extending cylindrical body A has at the top of one of its lateral ends an inlet opening B, and at the bottom of another end an outlet opening C. Said cylindrical body A has also an air or bubble escape chamber D which communicates with said body and extends from the upper wall of said body upwardly and adjacently to the outlet opening C. An air escape pipe E is provided to the chamber D. In conventional devices having the above constructions in which the longitudinal length T of the cylindrical body A is considerably large (for example, 55 cm in the conventional one in the market) and in which hot water supplied from the inlet opening B runs substantially linearly and is discharged from the outlet opening C, the sufficient agitation of hot water in the cylindrical body isn't expected, whereby the escape of air bubbles from the hot water in piping and rendering noiseless the flow of hot water in the piping become insufficient.

SUMMARY OF THE INVENTION

In the present invention, the aforementioned drawbacks have been solved, whereby the device becomes compact, and a single unit of the device can achieve almost completely the escape of air from the fluid as it has excellent efficiency of having air bubbles escape from the fluid.

BRIEF DESCRIPTION OF THE DRAWINGS

FIG. 3 is a cross-section along line III—III of FIG. 2.

FIG. 4 is a cross-section along line IV—IV of FIG. 2.

FIG. 5 is an elevational cross-section of another embodiment of the present invention.

FIG. 6 is a cross-section along line VI—VI of FIG. 5.

FIG. 7 is an elevational cross-section of a further embodiment of the present invention.

DETAILED DESCRIPTION OF PREFERRED EMBODIMENTS

Figure 1:
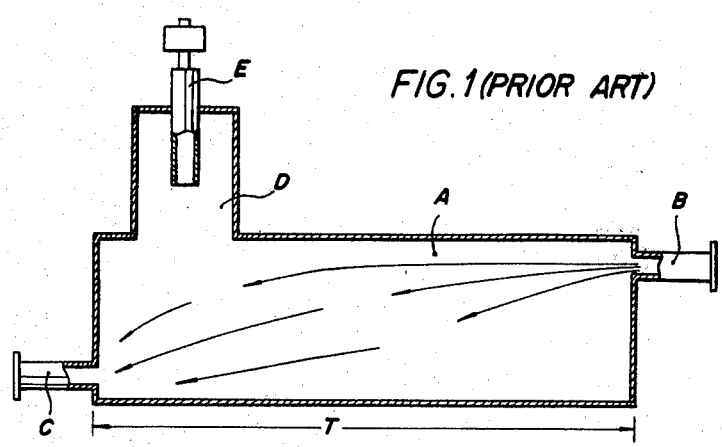
FIG. 1 is a schematic, general illustration of a known device for separating air bubbles in fluids in piping and silencing water flow.
Figure 2:
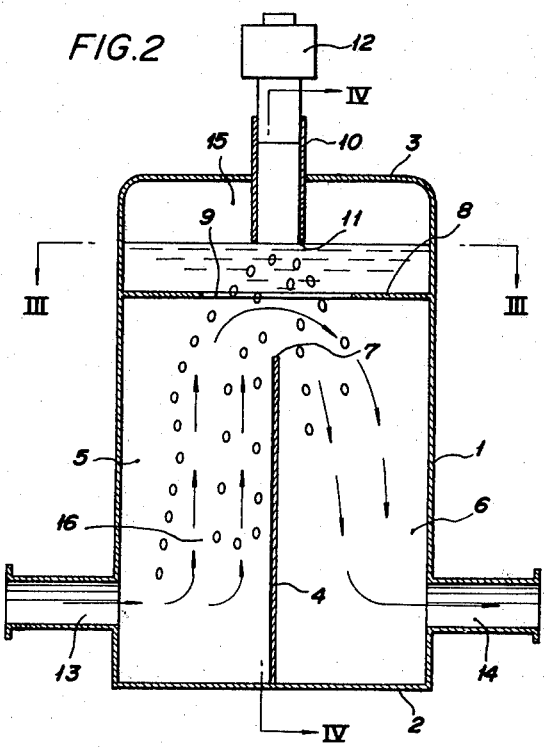
FIG. 2 is an elevational cross-section of an embodiment of the present invention.

In the drawing, particularly FIGS. 2 to 4 which show an embodiment of this invention, numeral 1 indicates a cylindrical body which extends vertically, in contrast to the prior one which extends horizontally. Said vertically extending cylindrical body 1 is closed at its lower bottom by a bottom wall 2, while its upper part is closed by an upper wall 3. A vertically extending partition wall 4 is provided to the center of the cylindrical body 1. The lower edge of said partition wall 4 is closely fitted onto the bottom wall 2, and its lateral edges are closely fitted to the vertical inner side wall a (as best shown in FIG. 4). This partition wall constitutes in the cylindrical body 1 an inlet chamber 5 and a discharge chamber 6. The upper edge 7 of the partition wall 4 does not reach the upper wall 3. A horizontally extending partition wall 8 is provided between said upper wall 3 and the upper edge 7 of partition wall 4. The circumferential edge of the horizontal partition wall 8 is closely fitted to the inner side wall a of the cylindrical body 1, while said horizontal partition wall 8 has at its center an opening which is preferably circular. An air escape chamber is thus formed between the horizontal partition wall 8 and the upper wall 3. An air escape pipe 10 which is provided to the upper wall 3 centrally and vertically thereto, has a lower end 11 which opens in the air escape chamber 15. Numeral 12 indicates air escaping means. To the lower lateral sides of the body 1 and with the vertical partition wall 4 therebetween, there are provided an inlet opening 13 and an outlet opening 14 which are substantially same in height. An eddy current passage 16 is thus formed between the inlet opening 13 and the vertical partition wall 4.

In FIGS. 5 to 6 which show another embodiment of this invention device, the cylindrical body 1 extends horizontally as in the case of the prior devices, but it is characterized in that its inlet opening 13 extends vertically to the body 1 and adjacently to one of its lateral ends, whereby the hot water supplied from the said inlet opening into the cylindrical body 1 runs first downwardly to strike against the bottom wall 2, and whereby the fluid swirls, flows in whirls, and is discharged from the outlet opening 14.

Figure 8:
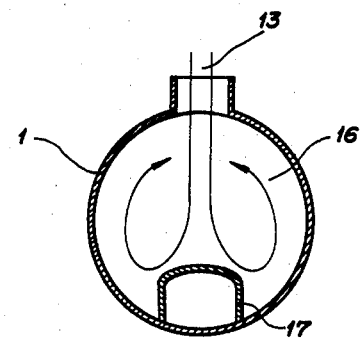
FIG. 8 is a cross-section along line VIII—VIII of FIG. 7.
Figure 9:
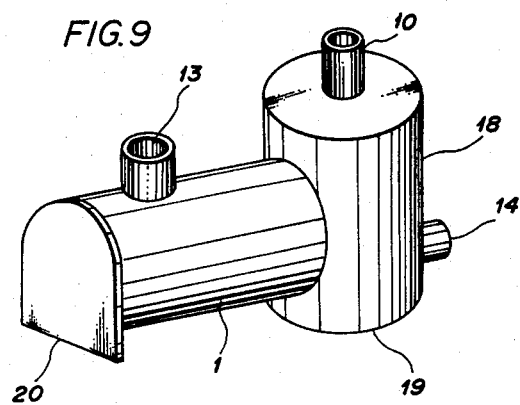
FIG. 9 is a perspective view of the embodiment of FIG. 7.

In FIGS. 7 to 9 which show further another embodiment of this invention, the device illustrated in the second embodiment of FIGS. 5 to 6 is further improved. It has an inlet opening 13 which extends vertically to the longitudinal direction of the cylindrical body 1, similarly to the second embodiment. In addition to the unique installation of such inlet opening, it is characterized in that there is provided at the bottom wall 2 a projection 17 which has a semi-circular cross section and against which the fluid supplied from the inlet opening and flowing first downwardly strikes vigorously. The air escape chamber 15 has constructions same to the second embodiment, except that the wall 2 projects downwardly at the portion which faces against the air escape chamber 15, so as to form a downwardly extending chamber 19. Numeral 20 indicates a leg support which lifts the inlet side of the chamber 1 to the height corresponding to the aforementioned downwardly extending chamber 19.

The devices having the above constructions operate as follows.

First, in the device illustrated by FIGS. 2 to 4, hot water supplied from the inlet opening 13 strikes against the vertical partition wall 4 and changes its flowing direction upwardly, whereby the water is vigorously agitated, bubbled actively forming whirlpools 16, and thereby deflated and silenced considerably. In the device illustrated by FIGS. 5 to 6, the hot water supplied from the inlet opening 13 strikes against the bottom wall 2, whereby it forms the whirling flow 16 while it is agitated and bubbled, and whereby it is effectively deflated and silenced.

In the device illustrated by FIGS. 7 to 9, the hot water supplied from the inlet opening 13 is actively bubbled when it flows downwardly and strikes against the projection 17. The said hot water is further bubbled and silenced, when it flows from the body 1 into the air escape chamber 18, since the water is diverted into said chamber 18 and also into the chamber 19.

Test results made with one of the devices of this invention are as follows.

| Test No. | Amount of air captured (c.c.) | Time for capture (minute) | Amount of air captured in an unit of time (c.c./minute) | Remarks |
|---|---|---|---|---|
| 1 | 316.51 | 2.47 | 128.14 | |
| 2 | 316.51 | 2.45 | 129.19 | |
| 3 | 316.51 | 2.42 | 130.79 | |
| 4 | 316.51 | 2.37 | 133.55 | flow rate |
| 5 | 316.51 | 2.33 | 135.84 | 25.4 l/minute |
| 6 | 316.51 | 2.43 | 130.25 | |
| 7 | 316.51 | 2.43 | 130.25 | |
| Average | 316.51 | 2.41 | 131.14 | |

The average rate of air captured from the hot water of a flow rate of 25.4 l/minute in the seven tests was 131.14 c.c./minute. This means that air is captured at a rate of about 130 c.c./minute from a flow of about 26 l/minute, and this also means that the present invention device can capture air more than 5 to 6 times of air conventional devices can capture.

Hence, a single device made in accordance with this invention can replace 5 to 6 units of conventional devices, whereby it is eliminated to employ a plurality of devices.

A working principle of this invention is considered to be same to that working upon carbon dioxide mixed to beer. When beer is poured vigorously into a glass from a bottle, a lot of bubbles produce, but when it is poured gently, it doesn't produce much bubbles. The provision of the partition wall 4, or the formation of whirling passages 16 by the specific location of inlet opening 13 is to produce the active agitation of the flow of fluids. Hence, if a mechanical agitator is additionally provided to the device, its efficiency shall further be enhanced.

As repeatedly described above, this invention lies in capturing bubbles from cold or hot water by agitating it through the formation of whirling passages 16. Air capturing efficiency and silencing efficiency are extremely good in this invention.

What is claimed is:

1. A device for separating air bubbles from a fluid flow and for silencing sound carried from the fluid flow into a pipe system which includes an inlet and an outlet pipe, consisting essentially of:

a hollow, substantially non-obstructed chamber having a longitudinal axis, which chamber is large in comparison with the cross-sectional measurement of the pipes in the system, said chamber having respective inlet and outlet ends and having an inlet opening at the inlet end and an outlet opening at the outlet end, the inlet pipe being connected to said inlet opening and the outlet pipe being connected to said outlet opening, said chamber further having an air capturing space protruding from the top of said chamber at a position nearer to said outlet end than to said inlet end, and a downwardly extending portion provided opposite said upwardly protruding air capturing space, wherein said inlet opening is at the top of said chamber and directs the incoming fluid downwardly, transversely to the longitudinal axis of said chamber in an axial plane, and said chamber further includes a projection, which is substantially semicircular in cross-section, projecting inwardly of said chamber, adjacent the wall of the chamber opposite said inlet opening, whereby incoming fluid is caused to strike against the wall of the chamber opposite said inlet opening and to swirl and flow in whirls toward said outlet end, thereby providing greater release of bubbles.

* * * * *